United States Patent
Levin et al.

(10) Patent No.: US 11,303,432 B2
(45) Date of Patent: Apr. 12, 2022

(54) LABEL-BASED DOUBLE KEY ENCRYPTION

(71) Applicant: Microsoft Technology Licensing, LLC, Redmond, WA (US)

(72) Inventors: Benjamin Sean Levin, Seattle, WA (US); Kartik Tirunelveli Kanakasabesan, Sammamish, WA (US); Laurie Lee Litwack, North Bend, WA (US); Kurt Matthew Brendon, Redmond, WA (US); Ajay Kumar Karanam, Redmond, WA (US); Kiran Doreswamy, Sammamish, WA (US); Ryan Jay Best, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 88 days.

(21) Appl. No.: 16/864,269

(22) Filed: May 1, 2020

(65) Prior Publication Data

US 2021/0344485 A1    Nov. 4, 2021

(51) Int. Cl.
*H04L 9/08* (2006.01)
*H04L 9/14* (2006.01)

(52) U.S. Cl.
CPC .............. *H04L 9/0822* (2013.01); *H04L 9/14* (2013.01)

(58) Field of Classification Search
CPC ..... H04L 9/0822; H04L 9/14; H04L 63/0428; H04L 63/06; H04L 9/0825; H04L 9/0894; G06F 21/602; G06F 21/6218
See application file for complete search history.

(56) References Cited

U.S. PATENT DOCUMENTS

| | | |
|---|---|---|
| 2002/0144215 A1 | 10/2002 | Hoskote et al. |
| 2006/0069750 A1 | 3/2006 | Momtchilov et al. |
| 2006/0075105 A1 | 4/2006 | Momtchilov et al. |
| 2007/0006122 A1 | 1/2007 | Bailey et al. |
| 2010/0205249 A1 | 8/2010 | Momtchilov et al. |
| 2011/0239195 A1 | 9/2011 | Lin et al. |

(Continued)

FOREIGN PATENT DOCUMENTS

GB    2507191 A    4/2014

OTHER PUBLICATIONS

"Attribute-based access control", retrieved from <<https://en.wikipedia.org/wiki/Attribute-based_access_control>>, Feb. 17, 2020, 7 pages.

(Continued)

*Primary Examiner* — Abiy Getachew
(74) *Attorney, Agent, or Firm* — Ogilvie Law Firm

(57) ABSTRACT

Double key encryption encrypts sensitive data using a content key, obtains a user public key from a key management service, encrypts the content key using the user public key, and encrypts the result using a cloud service provider key. Data confidentiality is protected efficiently through multilevel encryption and also by utilizing keys that are managed by different entities. Sensitivity labeling allows analytics to track sensitive data without compromising confidentiality. Compliance mechanisms may use attribute-based access control to support storage of sensitive data in a cloud, but only inside a permitted region, and without giving the cloud service provider access to the sensitive data.

20 Claims, 4 Drawing Sheets

(56) References Cited

U.S. PATENT DOCUMENTS

| | | | |
|---|---|---|---|
| 2016/0255061 A1* | 9/2016 | Syed-Ebrahim | H04L 63/045 713/171 |
| 2016/0285625 A1* | 9/2016 | Roth | H04L 9/0825 |
| 2017/0286696 A1* | 10/2017 | Shetty | H04L 63/0471 |
| 2020/0005136 A1 | 1/2020 | Spryn et al. | |

OTHER PUBLICATIONS

"Hold your own key (HYOK) protection for Azure Information Protection", retrieved from <<https://docs.microsoft.com/en-us/azure/information-protection/configure-adrms-restrictions>>, Mar. 16, 2020, 10 pages.

"How AD RMS Works", retrieved from <<https://docs.microsoft.com/en-us/previous-versions/windows/it-pro/windows-server-2012-r2-and-2012/jj590750(v%3Dws.11)>>, Aug. 31, 2016, 7 pages.

"3.3.2.2 Generate a Publishing License", retrieved from <<https://docs.microsoft.com/en-us/openspecs/windows_protocols/ms-rmsod/073aeccb-e7e6-4a71-8a55-35ed27310d88>>, Feb. 14, 2019, 1 page.

"4.5.4 Publishing License Example", retrieved from <<https://docs.microsoft.com/en-us/openspecs/windows/_protocols/ms-rmpr/dbf5153c-469b-475c-9273-baccc93407f1>>, Feb. 14, 2019, 5 pages.

"AWS Key Management Service (KMS)", retrieved from <<https://aws.amazon.com/kms/>>, no later than Mar. 30, 2020, 7 pages.

"Cloud Key Management Service documentation", retrieved from <<https://cloud.google.com/kms/docs>>, no later than Mar. 30, 2020, 2 pages.

"Enterprise Key Management Solutions", retrieved from <<https://www.thalesesecurity.com/resources/solution-briefs/key-management-solution-brief>>, no later than Mar. 30, 2020, 3 pages.

"Enterprise Encryption Key Management", retrieved from <<https://safenet.gemalto.com/data-encryption/enterprise-key-management/>>, no later than Mar. 30, 2020, 9 pages.

"key management", retrieved from <<https://hubsecurity.io/category/key-management/>>, no later than Mar. 30, 2020, 19 pages.

"Equinix SmartKey™", retrieved from <<https://www.equinix.com/services/edge-services/smartkey/>>, no later than Mar. 30, 2020, 3 pages.

"Enterprise Key Management", retrieved from <<https://hsm.utimaco.com/products-hardware-security-modules/key-management/eskm/>>, no later than Mar. 30, 2020, 5 pages.

"YubiKey Manager", retrieved from <<https://www.yubico.com/products/services-software/download/yubikey-manager/>>, no later than Mar. 30, 2020, 1 page.

Kevin McKeogh, "The problem of keys, keys management, and the need to provide strong enforcement", retrieved from <<https://www.ncipher.com/blog/category/key-management>>, Feb. 19, 2019, 6 pages.

"Hardware security module", retrieved from <<https://en.wikipedia.org/wiki/Hardware_security_module>>, Mar. 26, 2020, 7 pages.

Balaouras, et al., "Protect Your Intellectual Property And Customer Data From Theft And Abuse", Retrieved from: https://www.forrester.com/report/Protect+Your+Intellectual+Property+And+Customer+Data+From+Theft+And+Abuse/-/E-RES61476#endnote2, Apr. 16, 2019, 3 Pages.

"International Search Report and Written Opinion Issued in PCT Application No. PCT/US2021/022449", dated May 17, 2021, 13 Pages.

\* cited by examiner

LABEL-BASED DOUBLE KEY ENCRYPTION

BACKGROUND

Attacks on computing systems and the data they contain take many different forms, including some forms which are difficult to predict, and forms which may vary significantly from one situation to another. But a wide variety of hardware and software tools may be available in a given situation to improve cybersecurity by protecting data confidentiality, data integrity, data and system availability, or privacy, for example. Detection tools may detect anomalies, rule violations, unexpected behaviors, and other events or conditions that can be investigated by a security analyst. Many devices provide forensic data, such as logs that track events of likely interest. Some security tools and techniques aid the investigation of suspicious events in a computing system. Some tools and techniques reduce vulnerabilities, to make an attack more difficult, to decrease damage from an attack, or facilitate repairing the damage caused by an attack.

However, attackers continue to create new kinds of attacks and to improve the effectiveness of known attack categories. Accordingly, technical advances that extend or leverage the functionality of existing cybersecurity tools and techniques would also be helpful.

SUMMARY

Some embodiments described in this document provide improved technology for protecting data confidentiality with multiple levels of encryption without also imposing a severe computational overhead or a burdensome user experience. Some embodiments facilitate efficient and reliable compliance with corporate policies and government regulations by supporting storage of sensitive data in a cloud, but only inside a permitted geographic region, and without forcing the data's owner to give the cloud service provider full access to the sensitive data. Some embodiments allow analytics to track the locations and usages of sensitive data, whether on-premise or in the cloud, without compromising the confidentiality of that data.

Some embodiments use or provide a multilevel confidentiality protection hardware and software combination which includes a digital memory and a processor which is in operable communication with the memory. The processor is configured, e.g., by tailored software, to perform certain steps for protecting confidentiality of sensitive data. The steps may include (a) getting a content key, (b) encrypting the sensitive data using the content key, thereby producing content-key-encrypted sensitive data, (c) obtaining a user public key from a user key management service, (d) encrypting the content key using the user public key, thereby producing a user-key-encrypted content key that is decryptable using a user private key that corresponds to the user public key, and (e) encrypting the user-key-encrypted content key using a cloud service provider key, thereby producing a double-encrypted content key. In this manner, the confidentiality of the sensitive data is protected by using at least three levels of encryption and also by utilizing keys which as a set are managed by at least two key management entities.

Some embodiments use or provide steps performed by or on behalf of a connectable application to enhance confidentiality protection of sensitive data. The steps may include getting a content key which is a symmetric encryption key; symmetrically encrypting the sensitive data using the content key, thereby producing content-key-encrypted sensitive data; obtaining a user public key from a user key management service; asymmetrically encrypting the content key using the user public key, thereby producing a user-key-encrypted content key that is decryptable using a user private key that corresponds to the user public key; and asymmetrically encrypting the user-key-encrypted content key using a cloud service provider key managed by a cloud service provider, thereby producing a double-encrypted content key. In this manner, confidentiality of the sensitive data is protected by using at least three levels of encryption and also by utilizing keys which as a set are managed by at least two key management entities.

Some embodiments use or provide a computer-readable storage medium configured with data and instructions, or use other computing items, which upon execution by a processor cause a computing system to perform a method to enhance confidentiality protection of sensitive data. In particular, some embodiments encrypt the sensitive data using a content key, thereby producing content-key-encrypted sensitive data, obtain a user public key from a user key management service, asymmetrically encrypt the content key using the user public key, thereby producing a user-key-encrypted content key that is decryptable using a user private key that corresponds to the user public key, and asymmetrically encrypt the user-key-encrypted content key using a cloud service provider key managed by a cloud service provider, thereby producing a double-encrypted content key. In this manner, confidentiality of the sensitive data is protected by using at least three levels of encryption and also by utilizing keys which as a set are managed by at least two key management entities.

Other technical activities and characteristics pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims as properly understood, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Innovations may expand beyond their origins, but understanding an innovation's origins can help one more fully appreciate the innovation. In the present case, some teachings described herein were motivated by technical challenges faced by Microsoft innovators who were working to improve the feature set, security, and usability of Microsoft cloud service offerings, including some versions of Azure® cloud storage offerings and some cloud-connected application software offerings such as Office 365® services (marks of Microsoft Corporation).

In particular, a technical challenge was to how to give Microsoft cloud service administrators access to customer data that is sufficient to perform expected administrative tasks such as metering usage and responding to customer support requests, without incidentally providing those cloud service administrators with access capabilities that conflict with regulatory and policy compliance goals. Other technical challenges are also addressed by teachings herein. For example, some challenges addressed herein are how to efficiently protect data using encryption, which kinds of encryption to use, how to distribute access to encryption keys, and how to gather statistics about the extent of sensitive data within an organization without access to the sensitive data itself. One of skill will recognize these and other technical challenges as they are addressed at various points within the present disclosure.

Other aspects of these embodiments, and other data confidentiality protection enhancement embodiments, are also described herein.

Operating Environments

Figure 1:
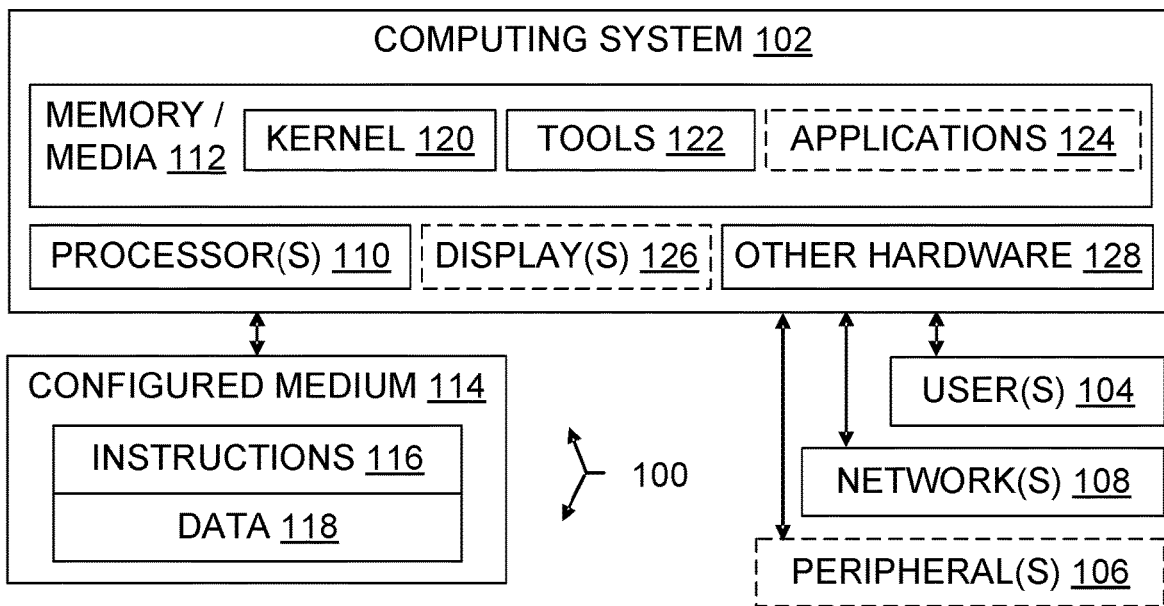
FIG. 1 is a block diagram illustrating computer systems generally and also illustrating configured storage media generally.

With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud. An individual machine is a computer system, and a network or other group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A screen 126 may be a removable peripheral 106 or may be an integral part of the system 102. A user interface may support interaction between an embodiment and one or more human users. A user interface may include a command line interface, a graphical user interface (GUI), natural user interface (NUI), voice command interface, and/or other user interface (UI) presentations, which may be presented as distinct options or may be integrated.

System administrators, network administrators, cloud administrators, security analysts and other security personnel, operations personnel, developers, testers, engineers, auditors, and end-users are each a particular type of user 104. Automated agents, scripts, playback software, devices, and the like acting on behalf of one or more people may also be users 104, e.g., to facilitate testing a system 102. Storage devices and/or networking devices may be considered peripheral equipment in some embodiments and part of a system 102 in other embodiments, depending on their detachability from the processor 110. Other computer systems not shown in FIG. 1 may interact in technological ways with the computer system 102 or with another system embodiment using one or more connections to a network 108 via network interface equipment, for example.

Each computer system 102 includes at least one processor 110. The computer system 102, like other suitable systems, also includes one or more computer-readable storage media 112. Storage media 112 may be of different physical types. The storage media 112 may be volatile memory, non-volatile memory, fixed in place media, removable media, magnetic media, optical media, solid-state media, and/or of other types of physical durable storage media (as opposed to merely a propagated signal or mere energy). In particular, a configured storage medium 114 such as a portable (i.e., external) hard drive, CD, DVD, memory stick, or other removable non-volatile memory medium may become functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se or mere energy under any claim pending or granted in the United States.

The storage medium 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside, when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processors 110 (e.g., CPUs, ALUs, FPUs, TPUs and/or GPUs), memory/storage media 112, and displays 126, an operating environment may also include other hardware 128, such as batteries, buses, power supplies, wired and wireless network interface cards, for instance. The nouns "screen" and "display" are used interchangeably herein. A display 126 may include one or more touch screens, screens responsive to input from a pen or tablet, or screens which operate solely for output. In some embodiments peripherals 106 such as human user I/O devices (screen, keyboard, mouse, tablet, microphone, speaker, motion sensor, etc.) will be present in operable communication with one or more processors 110 and memory.

In some embodiments, the system includes multiple computers connected by a wired and/or wireless network 108. Networking interface equipment 128 can provide access to networks 108, using network components such as a packet-switched network interface card, a wireless transceiver, or a telephone network interface, for example, which may be present in a given computer system. Virtualizations of networking interface equipment and other network components such as switches or routers or firewalls may also be present, e.g., in a software-defined network or a sandboxed or other secure cloud computing environment. In some embodiments, one or more computers are partially or fully "air gapped" by reason of being disconnected or only intermittently connected to another networked device or remote cloud or enterprise network. In particular, data confidentiality protection functionality could be installed on an air gapped network and then be updated periodically or on occasion using removable media. A given embodiment may also communicate technical data and/or technical instructions through direct memory access, removable non-volatile storage media, or other information storage-retrieval and/or transmission approaches.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but may interoperate with items in the operating environment or some embodiments as discussed herein. It does not follow that items not in outline or parenthetical form are necessarily required, in any Figure or any embodiment. In particular, FIG. 1 is provided for convenience, inclusion of an item in FIG. 1 does not imply that the item, or the described use of the item, was known prior to the current innovations.

More about Systems

Figure 2:
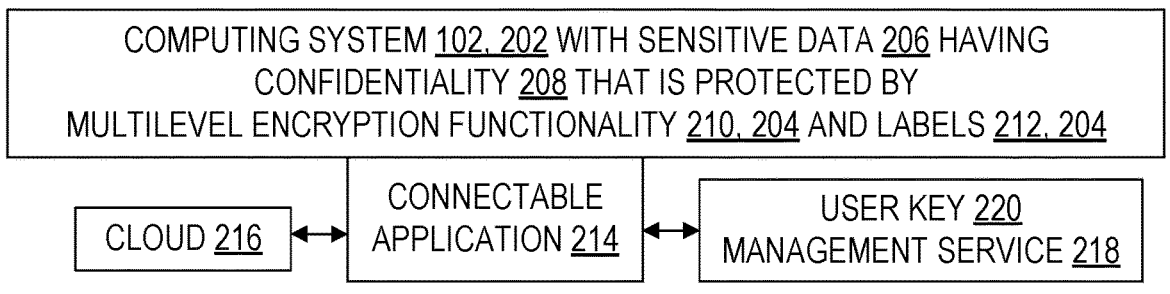
FIG. 2 is a block diagram illustrating a computing system equipped with data confidentiality protection functionality using multilevel encryption and sensitivity labels, and some aspects of a surrounding context.

FIG. 2 illustrates an environment having an enhanced system 202, 102 that includes data confidentiality protection functionality 204. In particular, the illustrated system 202 includes sensitive data 206 that has some level of confidentiality 208. The criteria for treating data 118 as sensitive data 206, and the precise scope of confidentiality 208 for that sensitive data 206, may vary from one organization to another, from one part of an organization to another, and over time, for example, but the teachings herein may be beneficially applied to enhance data confidentiality protection despite such variations.

Two particular aspects of data confidentiality protection functionality 204 described herein involve multilevel encryption 210 and sensitivity labels 212. These data confidentiality protection functionalities 210 and 212 may be used individually or jointly in a given situation. In particular, these functionalities 210 and 212 may be employed to enhance protection of sensitive data 206 that is created, read, modified, or otherwise processed within connectable applications 214. Connectable applications 214 include applications 124 that run within a cloud 216 or that connect to a cloud 216, e.g., to store sensitive data 206 in the cloud or to read sensitive data 206 from the cloud. As described herein, when multilevel encryption 210 is used such connectable applications 214 may also communicate electronically with a service 218 that manages user keys 220.

As additional context, attackers (not shown) who seek to damage or destroy the confidentiality 208 of sensitive data 206 may reside outside a network 108 boundary that is defined, e.g., by firewalls. But teachings herein may also be advantageously applied to prevent or mitigate attacks on confidentiality that are perpetrated by insider attackers. Similarly, the system 202 may communicate with a separately located cybersecurity center (not shown), while in other environments an enhanced system 202 resides inside the cybersecurity center, and in still others the enhanced system 202 operates without any cybersecurity center per se.

Figure 3:
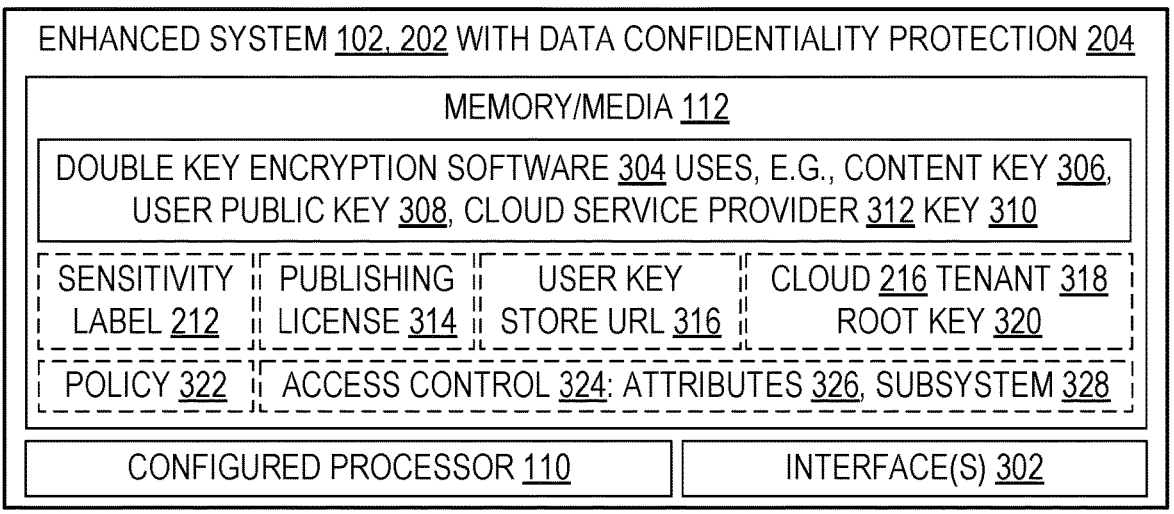
FIG. 3 is a block diagram illustrating an enhanced computing system configured for data confidentiality protection with at least multilevel encryption functionality in the form of double key encryption software.

FIG. 3 illustrates an enhanced system 202 which is configured with data confidentiality protection functionality 204. The system 202 may be networked generally or communicate in particular (via network, shared memory, shared files, or otherwise) with a cloud 216, another network 108, and other computing devices through one or more interfaces 302. An interface 302 may include hardware such as network interface cards, software such as network stacks, APIs, or sockets, combination items such as network connections, or a combination thereof.

The illustrated system 202 includes double key encryption (DKE) software 304 which configures the system to perform computations that may include encryption or decryption using a content key 306, a user public key 308, and a key 310 managed by a cloud service provider 312, as described in detail herein. In particular, the double key encryption software 304 may perform a method 900 illustrated in one or more of FIGS. 9 and 10.

FIG. 3 also shows several additional items such as a publishing license 314, a user key store 218 uniform resource locator 316, a cloud tenant root key 320, a policy 322, and access control attributes 326. These items are discussed at various points herein, and additional details regarding them are provided in the discussion of a List of Reference Numerals later in this disclosure document.

Figure 4:
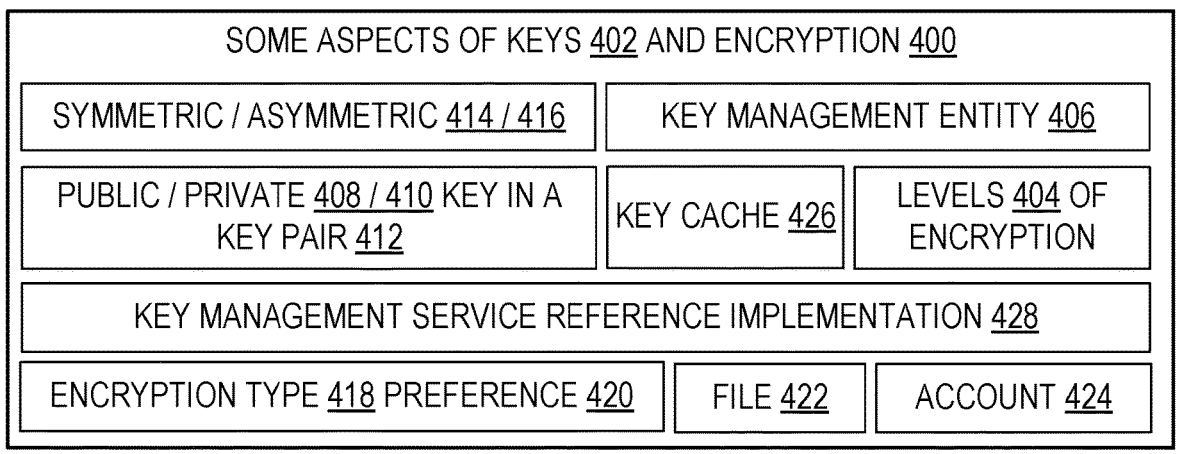
FIG. 4 is a block diagram illustrating some aspects of encryption and encryption keys.
Figure 5:
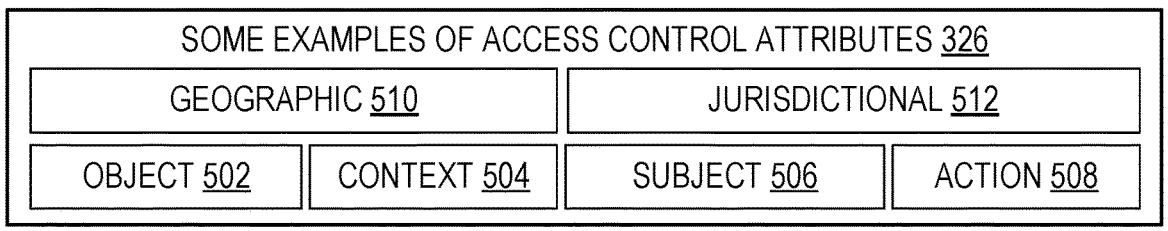
FIG. 5 is a block diagram illustrating some examples of access control attributes.
Figure 6:
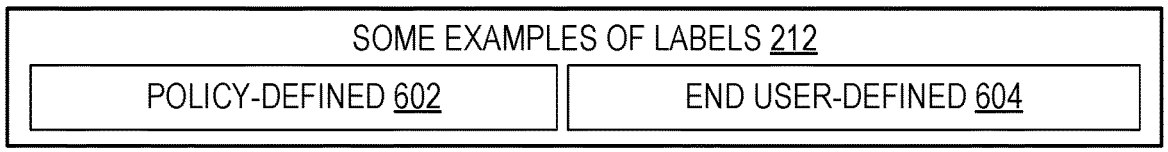
FIG. 6 is a block diagram illustrating some examples of data sensitivity labels.
Figure 7:
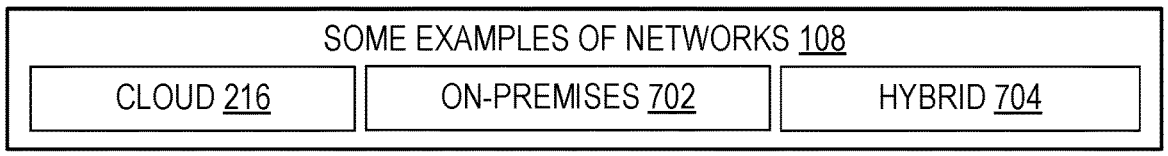
FIG. 7 is a block diagram illustrating some examples of computing networks.
Figure 8:
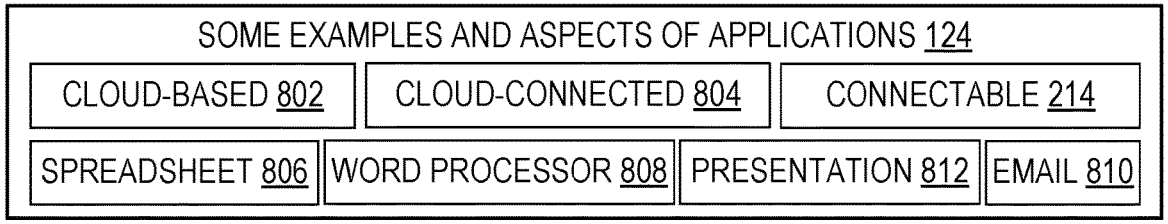
FIG. 8 is a block diagram illustrating some examples of and aspects of software-implemented applications.

FIG. 4 illustrates some aspects of encryption 400 and encryption keys 402. FIG. 5 illustrates some examples of access control attributes 326. FIG. 6 illustrates some examples of data sensitivity labels 212. FIG. 7 illustrates some examples of computing networks 108. FIG. 8 illustrates some examples of software-implemented applications 124 and some aspects of such applications 124. These illustrated items are discussed at various points herein, and additional details regarding them are provided in the discussion of a List of Reference Numerals later in this disclosure document.

With reference now to all of the drawing figures, some embodiments use or provide a functionality-enhanced system, such as system 202 or another system 102 that is enhanced as taught herein. In some embodiments, a system which is configured for multilevel encryption confidentiality protection includes a digital memory 112, and a processor 110 in operable communication with the memory. The processor 110 is configured to perform double key encryption steps for protecting confidentiality 208 of sensitive data 206. The steps may include (a) getting a content key 306, (b) encrypting the sensitive data using the content key, thereby producing content-key-encrypted sensitive data 908, (c) obtaining a user public key 308 from a user key management service 218, (d) encrypting the content key using the user public key, thereby producing a user-key-encrypted content key 914 that is decryptable using a user private key that corresponds to the user public key, and (e) encrypting the user-key-encrypted content key using a cloud service provider key 310, thereby producing a double-encrypted content key 918. In this enhanced system 202, confidentiality of the sensitive data is thus protected by using at least three levels 404 of encryption and also by utilizing keys 402 which as a set are managed by at least two key management entities 406, namely, the system end-user 104 entity, and the cloud service provider 312.

Some enterprises employ confidentiality approaches that use a third party, through a cloud service, for key management. But when responsibility for generating the managed keys and ultimate authority over use of the managed keys rests with the enterprise, then the enterprise—not the cloud service—is the actual key manager. Thus, mere usage of a cloud key store does not, on its own, provide the two-entity key management functionality described herein.

Some embodiments include a content key 306 which is encrypted first by a user's public key and then by a cloud service provider's key. It is contemplated that in most if not all embodiments, the user's key is a public key 408 and hence part of a public-private key pair 412; in other words, the user's key is for asymmetric 416 encryption. A key 402 used for asymmetric 416 encryption may also be referred to as an asymmetric key 416, 402. However, embodiments may vary as to whether the content key 306 and the cloud service provider's key 310 are symmetric 414 or asymmetric 416, that is, whether one or both of them is a symmetric key 414, 402 or an asymmetric key 416, 402.

For example, some embodiments use or include a symmetric content key 306, 414 and an asymmetric cloud service provider's key 310, 416. In some embodiments, the enhanced system 202 is characterized in at least one of the following ways: the content key 306 is a symmetric encryption key 414, or the cloud service provider key 310 is a public key 408 which corresponds to a cloud service provider private key 410.

In some cloud computing environments, each tenant 318 has a respective root key 320. Cloud tenants 318 may correspond one-to-one with corporations or with other customers, or not. For example, a given corporation or other customer may operate in the cloud 216 as more than one tenant, e.g., an accounting department, a human resources department, and a research and development department could each operate as their own respective tenant 318 even though they are all departments of a single corporation.

Some embodiments use a publishing license 314 as an access rights control. The publishing license 314 typically contains data that is relied upon by an actor to obtain rights to an encrypted document and to decrypt it, if rights are granted. Publishing licenses 314 may be enhanced to include access control information for double key encryption. For example, in some embodiments a publishing license 314 contains the encrypted content key 914, and an encrypted policy 322.

Some embodiments include applications 124 that generate content keys 306, on a per-user basis or a per-document basis, for example. Content keys may instead be generated by a centralized key management service.

More generally, features such as content key generation location, publishing license usage and fields, tenant root keys, and others described herein or known previously, may be compatible with usage by or in an enhanced system 202, with suitable adaptations discussed herein or otherwise within the reach of one of skill informed by the present disclosure. Content key usage may be adapted, for example, by multilevel encryption as taught herein. Publishing licenses may be adapted, for example, by the addition of a user key management service URL 316 or encryption preference 420 or encrypted content key. Tenant root key usage may be adapted, for example, to include multilevel encryption as taught herein. Thus, some embodiments are characterized in at least one of the following ways: the content key 306 is generated by a cloud-based application 802, 214, the cloud service provider key 310 is a cloud tenant root key 320, or the user-key-encrypted content key 914 is in a publishing license 314 which also contains a rights management policy 322.

In some embodiments, the sensitive data 206 is associated with a sensitivity label 212. Aspects of labels 212 may vary between embodiments. In some, the sensitivity label includes a uniform resource locator 316 of the user key management service. In some, the sensitivity label 1212 indicates that double key encryption (DKE) is in use (or should be in use) to protect the sensitive data. In some, both of these characterizations hold.

As an aside, although distinctions between classifications and labels may be made in other contexts, the present discussion uses "classification" and "label" interchangeably to mean a value associated with sensitive data 206 that requests or causes the system to use DKE to protect that data.

Some embodiments use or provide a label-driven approach to DKE. In some embodiments and some configurations, labels 212 are applied manually, and in some labels 212 are automatically determined and applied (e.g., based on keywords in the data 118, or on who 104 generated the data). Some embodiments permit both manual labeling and automatic labeling.

As used herein, "inducing" 1018 double key encryption protection means authorizing or requesting or requiring double key encryption protection. In some embodiments, the sensitive data 206 is associated with a particular sensitivity label value which induces double key encryption protection, and the system 202 is configured to perform the double key encryption steps in response to recognizing or receiving the particular sensitivity label value.

Some embodiments support attribute-based access control 324. In some, the system 202 is configured with an attribute-based access control subsystem 328 which is configured to utilize the keys to control access to the sensitive data based on at least one attribute 326 defined in a policy 322.

Other system embodiments are also described herein, either directly or derivable as system versions of described processes or configured media, duly informed by the extensive discussion herein of computing hardware.

Although specific architectural examples are shown in the Figures, an embodiment may depart from those examples. For instance, items shown in different Figures may be included together in an embodiment, items shown in a Figure may be omitted, functionality shown in different items may be combined into fewer items or into a single item, items may be renamed, or items may be connected differently to one another.

Examples are provided in this disclosure to help illustrate aspects of the technology, but the examples given within this document do not describe all of the possible embodiments. A given embodiment may include additional or different technical features, security mechanisms, operation sequences, data structures, or functionalities for instance, and may otherwise depart from the examples provided herein.

Processes (a.k.a. Methods)

Figure 9:
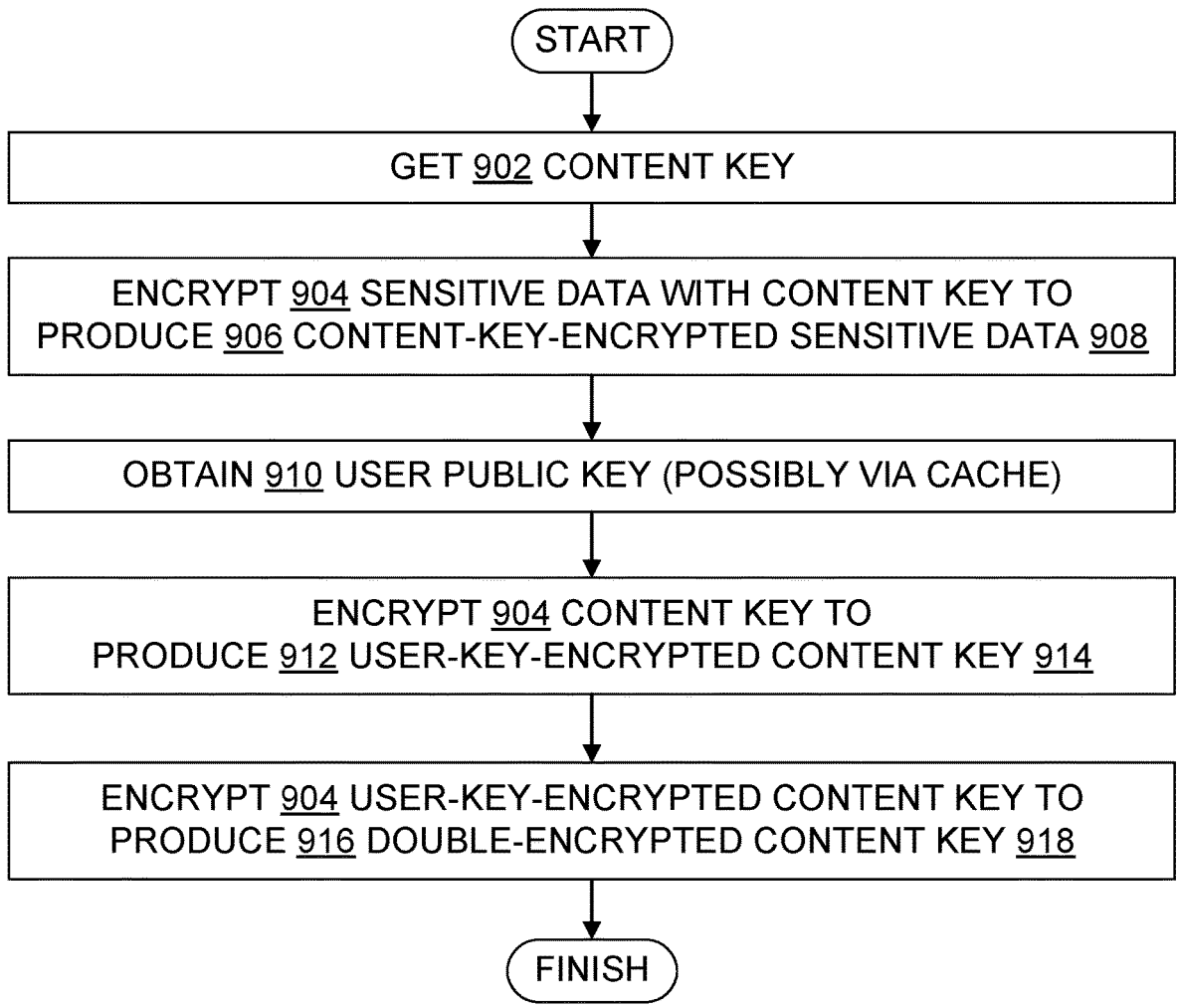
FIG. 9 is a flowchart illustrating steps in some double key encryption (DKE) methods, which are examples of data confidentiality protection methods.
Figure 10:
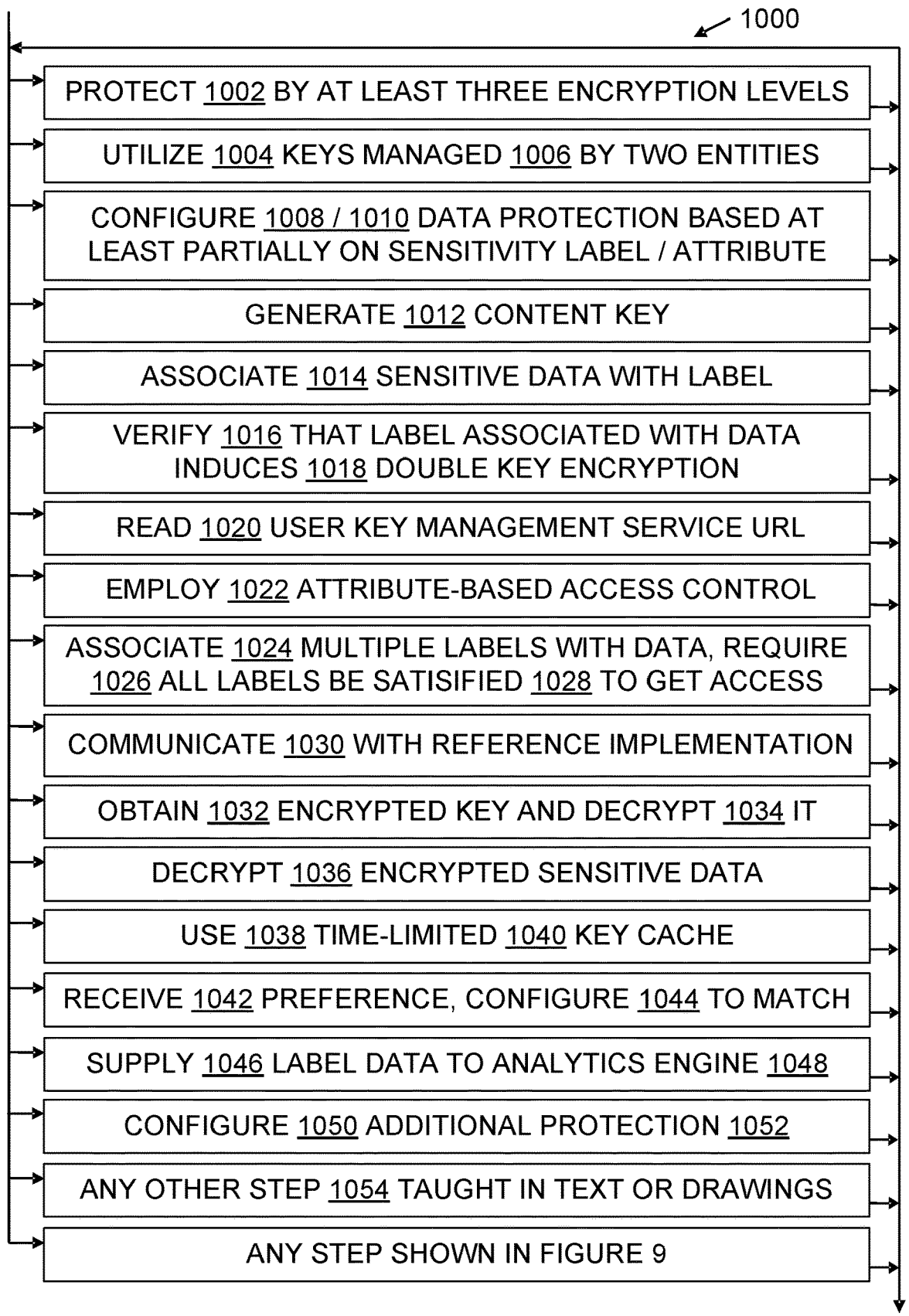
FIG. 10 is a flowchart further illustrating steps in some data confidentiality protection methods.

FIG. 9 illustrates a family of double key encryption methods 900 that may be performed or assisted by an enhanced system, such as system 202 or another functionality 210 enhanced system as taught herein. FIG. 10 further illustrates double key encryption methods and other data confidentiality protection methods (which may also be referred to as "processes" in the legal sense of that word) that are suitable for use during operation of a system which has innovative functionality taught herein. FIG. 10 includes some refinements, supplements, or contextual actions for steps shown in FIG. 9, as well as methods which do not necessarily involve steps of FIG. 9. FIG. 10 as a whole does incorporate all steps shown in FIG. 9, as steps that may be part of a particular embodiment.

Technical processes shown in the Figures or otherwise disclosed will be performed automatically, e.g., by an enhanced system 202 or software component thereof, unless otherwise indicated. Processes may also be performed in part automatically and in part manually to the extent activity by a human person is implicated. For example, in some situations, by entering a command to save a file 422, a human end user triggers the creation of a content key 306 followed by a use of that content key in a DKE method 900 implemented with a connectable application 214. In some situations, a human end user triggers decryption of DKE-protected content 206 by entering a command to open a file 422 containing such content 206. However, no process contemplated as innovative herein is entirely manual.

In a given embodiment zero or more illustrated steps of a process may be repeated, perhaps with different parameters or data to operate on. Steps in an embodiment may also be done in a different order than the top-to-bottom order that is laid out in FIGS. 9 and 10. Steps may be performed serially, in a partially overlapping manner, or fully in parallel. In particular, the order in which flowchart 900 or flowchart 1000 operation items are traversed to indicate the steps performed during a process may vary from one performance of the process to another performance of the process. The flowchart traversal order may also vary from one process embodiment to another process embodiment. Steps may also be omitted, combined, renamed, regrouped, be performed on one or more machines, or otherwise depart from the illustrated flow, provided that the process performed is operable and conforms to at least one claim.

Some embodiments perform steps by or on behalf of a SaaS application client 802 or other connectable application 214. As used herein, a "connectable application" is a software application 124 that is or can be connected to a network 108 to access a user key management service. The network 108 may be or include a cloud 216, an on-premises network 702, a hybrid network 704 that has both a cloud portion and an on-premises portion, or another network 108. Some examples of connectable applications 214 are cloud-connected application clients 804, software-as-a-service applications 802 (e.g., Office 365® client software 806, 808, 812), and email applications 810 (mark of Microsoft Corporation).

Some embodiments use or provide a method performed by or on behalf of a connectable application 214 to enhance confidentiality 208 protection of sensitive data 206, including the following automatic steps: getting 902 a content key which is a symmetric encryption key; symmetrically encrypting 904 the sensitive data using the content key, thereby producing 906 content-key-encrypted sensitive data 908; obtaining 910 a user public key from a user key management service; asymmetrically encrypting 904 the content key using the user public key, thereby producing 912 a user-key-encrypted content key 914 that is decryptable using a user private key that corresponds to the user public key; and asymmetrically encrypting 904 the user-key-encrypted content key using a cloud service provider key managed 1006 by a cloud service provider, thereby producing 916 a double-encrypted content key 918.

Thus, confidentiality of the sensitive data is protected by using at least three levels 404 of encryption: symmetric encryption of content 206 itself using the content key, encryption of the content key using the user's public key, and further encryption of the encrypted content key using the cloud service provider's key. The outer two levels (corresponding to steps 916 and 912) enhance confidentiality protection very efficiently, because they encrypt data roughly the size of the content key, not data the size of the content 206 itself. Even the inner level (corresponding to step 906) is relatively efficient, because symmetric encryption of the content 206 will generally be less computationally expensive than asymmetric encryption of the content 206 would be.

Confidentiality of the sensitive data is protected by utilizing keys 402 which as a set are managed by at least two key management entities 406, namely, the end user's entity 406 and the cloud service provider 312, 406. The end user's entity may be a corporation, agency, institution, or even an individual human person, who is a customer, tenant 318, or other account holder of an account 424 that is provided with services by the cloud service provider.

Some embodiments use or provide a label-driven approach to DKE. Some use sensitivity labels 212; confidentiality protection functionality which uses sensitivity labels is also discussed herein using reference numeral 212. Note that "confidentiality protection" is understood broadly herein, to encompass not only encryption tools and techniques but also sensitivity labeling which guides or compels use of encryption, or sensitivity labeling which provides data for analysis of the scope and nature of encryption (or lack thereof) with respect to the data 118 in a system 102, or both.

Attributes 326 which are used for access control 324 may be functionally associated with, or may effectively operate as, sensitivity labels 212.

More generally, one of skill will acknowledge that access control attributes 326 may take various forms in different embodiments or different embodiment implementations consistent with teachings herein. In some situations, access control attributes 326 may be categorized as object attributes 502, context attributes 504, subject attributes 506, or action attributes 508. Some examples of object attributes 502 are those that describe a resource which is an object of an access attempt, e.g., the kind of account 424 (regular, administrator, credit card, gamer, . . . ), sensitivity or secrecy level, location, and so on. Some examples of context attributes 504 are those that describe environment, e.g., time or location or kernel. Some examples of subject attributes 506 are those that describe a user seeking access, e.g., clearance level, department, employee ID, role, title, or age. Some examples of action attributes 508 are those that describe the kind of access, e.g., read-only, read or write, archive without reading, delete, approve, or other actions.

These attribute categories are not necessarily mutually exclusive, e.g. location may be categorized as an object attribute or as a context attribute, depending on the implementation. Also, two location attributes of particular interest in conjunction with compliance are geographic location 510 and jurisdictional location 512. Often these may coincide, but not necessarily always. An applicable geographic location may be Germany, for example, while the applicable jurisdiction is GDPR.

In embodiments which support attribute-based access control, it is contemplated that geographic attributes 510 or legal jurisdictional attributes 512 in particular may be utilized for regulatory compliance or corporate governance policy compliance. In some embodiments, the method includes employing 1022 an attribute-based access control 324 coordinated with double key encryption 900 to control access to the sensitive data 206 based on at least one of the following attributes 326: a geographic attribute 510, or a legal jurisdiction attribute 512. For instance, when compliance requires storing any data that includes PII about citizens of country X only within country X, the geographic attribute 510 may be checked to determine where given data can be stored.

In some embodiments, the method includes verifying 1016, prior to asymmetrically encrypting 904 the content key using the user public key, that a sensitivity label 212 which is associated with the sensitive data induces 1018 double key encryption. That is, DKE can be driven by sensitivity labels 212.

In some embodiments that use or provide a label-driven approach to DKE, the embodiment gets the user key store 218 URL 316 from a location associated with a label 212, e.g., from within the label per se or from a data structure that identifies the label or is identified by the label. In some embodiments the user key management service URL 316 is stored in metadata of a document 422 or other content alongside label metadata. In some, obtaining 910 the user public key from the user key management service includes reading 1020 a uniform resource locator 316 of the user key management service 218 from a location that is associated with a sensitivity label 212, which is associated in turn with the sensitive data 206.

Some embodiments use multiple labels 212 per file or other quantum of data 118, e.g., in some an application client must apply both a DKE label and a user data protection (UDP) label to gain access to protected content 206. In this example, both labels must be satisfied 1028 to gain access to the content. Access will be denied if the actor requesting access lacks one of the DKE keys (e.g., has the cloud service provider key but not the user's private key), or if the actor is attempting an action not allowed by the UDP label (e.g., attempting to modify a read-only file). In some embodiments, one label is policy-based 602 and hence defined by an end user's administrator, while another label is defined 604 by the end-user per se, e.g., to specify access rights.

In some embodiments, the method includes associating 1024 multiple labels with the sensitive content, the labels including a first label which induces 1018 double key encryption protection of the sensitive content and also including a second label which specifies a user-defined protection of the sensitive content. The "first" and "second" in this description do not imply any ranking or ordering, they simply emphasize that two labels 212 are involved.

Some embodiments provide a unified user experience across different kinds of networks 108. For example, in some the method is repeated by instances of the connectable application 214 for multiple sets of sensitive data 206 which reside respectfully in at least two of the following: a cloud 216, an on-premises network 702, or a hybrid network 704 which spans a cloud and an on-premises network. This uniform experience can be accomplished by implementing data confidentiality protection functionality 204 in code that runs above network-specific code, e.g., above the transport layer, and by avoiding direct user interaction with the key store 218, key cache 426, and keys 402.

Some embodiments use a reference implementation 428 of the user key management service 218. One of skill understands that a reference implementation (sometimes called a "sample implementation" or a "model implementation") is a standard against which other implementations (possibly customized) are assessed for correctness, efficiency, usability, or other characteristics. In some embodiments, for example, obtaining 910 the user public key 308 from the user key management service includes communicating 1030 with a reference implementation 428 of the user key management service 218. A reference implementation may be provided by a cloud service provider to help customers set up the key management server. One may host the reference implementation in an on-premises key management server, or on a cloud, for example.

Some embodiments include decryption steps, which correspond generally to the encryption 904 steps described herein and are performed in reverse order from those encryption 904 steps. Some embodiments decrypt 1034 an outermost key 918 using a cloud service provider key and then pass along the resultant user key encrypted content key 914 for it to be decrypted 1034. Some embodiments obtain 1032 the user-key-encrypted content key 914 from the cloud service provider, obtain 910 the user private key 410 from the user key management service 218, decrypt 1034 the user-key-encrypted content key using the user private key, thereby reproducing the content key in a fully decrypted form, and then decrypt 1036 the sensitive data using the fully decrypted content key 306.

In a given embodiment or with a given embodiment, various applications 214 may use DKE. For example, in some embodiments the method is performed by or on behalf of one of the following connectable applications 214: a cloud-based word processor 808, 802, a cloud-connected word processor 808, 804 which runs locally on a user machine 102 outside the cloud 216, a cloud-based slide presentation application 812, 802, a cloud-connected slide presentation application 812, 804 which runs locally on a user machine 102 outside the cloud 216, a cloud-based spreadsheet application 806, 802, a cloud-connected spreadsheet application 806, 804 which runs locally on a user machine 102 outside the cloud 216, or an email application 810.

Configured Storage Media

Some embodiments include a configured computer-readable storage medium 112. Storage medium 112 may include disks (magnetic, optical, or otherwise), RAM, EEPROMS or other ROMs, and/or other configurable memory, including in particular computer-readable storage media (which are not mere propagated signals). The storage medium which is configured may be in particular a removable storage medium 114 such as a CD, DVD, or flash memory. A general-purpose memory, which may be removable or not, and may be volatile or not, can be configured into an embodiment using items such as DKE software 304, keys 402, 308, 310, 320, a key store 218, a key store URL 316, sensitivity labels 212, access control attributes 326, and a publishing license 314, in the form of data 118 and instructions 116, read from a removable storage medium 114 and/or another source such as a network connection, to form a configured storage medium. The configured storage medium 112 is capable of causing a computer system 102 to perform technical process steps for label-driven double key encryption and related functionalities, as disclosed herein. The Figures thus help illustrate configured storage media embodiments and process (a.k.a. method) embodiments, as well as system and process embodiments. In particular, any of the process steps illustrated in FIG. 9 or 10 or otherwise taught herein, may be used to help configure a storage medium to form a configured storage medium embodiment.

Some embodiments use or provide a computer-readable storage medium 112, 114 configured with data 118 and instructions 116 which upon execution by at least one processor 110 cause a computing system to perform a method to enhance confidentiality protection of sensitive data. This method includes: encrypting 904 the sensitive data using a content key, thereby producing 906 content-key-encrypted sensitive data 908; obtaining 910 a user public key from a user key management service; asymmetrically encrypting 904 the content key using the user public key, thereby producing 912 a user-key-encrypted content key 914 that is decryptable using a user private key that corresponds to the user public key; and asymmetrically encrypting 904 the user-key-encrypted content key using a cloud service provider key managed by a cloud service provider, thereby producing 916 a double-encrypted content key 918. Thus, confidentiality of the sensitive data is protected 1002 by using at least three levels of encryption and also by utilizing 1004 keys which as a set are managed 1006 by at least two key management entities.

Some embodiments cache an end user license 314 for a configurable period of time (e.g., N days) so that the end user can access the content 206 offline without hitting the cloud service provider or customer DKE service each time content is opened. In some, a method includes caching 426 at least one of the following for at least eight hours: the user public key 308, the cloud service provider key 310, thereby reducing or eliminating repetition of operations which obtained 910 the cached key or keys prior to caching.

Some embodiments allow customers to configure the type 418 of encryption 400 that is implemented in the reference implementation for their data protection needs, e.g., when a user prefers to use an HSM (hardware security module). In some embodiments, a method includes receiving 1042 an encryption type preference 420 and configuring 1044 an implementation of asymmetric encryption of the content key with the user public key to conform with the encryption type preference.

Some embodiments provide data for analytics and reporting of highly sensitive DKE protected data, e.g., label or classification data 212, without requiring direct access or visibility into the content 206 by the analytics engine. This is useful for a CISO (chief information security officer), a Compliance Manager, or similar personnel who are tasked with establishing compliance and is useful for regulatory reasons such as being able to fully understand the usage and spread of an organization's top secret data.

By having a classification label 212 associated with the content 206 and a classification that can happen offline locally using, e.g., a classification .dll or other tool, some embodiments can reason over the type of sensitive information that is present in the content 206 without direct access to the unencrypted content. An environment can then be configured with appropriate protection actions on the content, e.g., DKE. Moreover, the environment 100 may be configured 1050 with enhanced capabilities and services 1052 that govern data access, management and control of data throughout the data lifecycle, such as multi-factor authentication, attribute-based access control, access tracking, access revocation, various regulatory compliance policies, or data loss prevention.

In some embodiments, a method includes supplying 1046 label data 212 to an analytics engine 1048 without providing the analytics engine access to the sensitive data in an unencrypted form. In some embodiments, the method includes configuring 1050 at least one of the following additional protection mechanisms 1052 based at least in part on a result from the analytics engine: multi-factor authentication, attribute-based access control, data loss prevention, access tracking, or access revocation.

ADDITIONAL EXAMPLES AND OBSERVATIONS

One of skill will recognize that not every part of this disclosure, or any particular details therein, are necessarily required to satisfy legal criteria such as enablement, written description, or best mode. Any apparent conflict with any other patent disclosure, even from the owner of the present innovations, has no role in interpreting the claims presented in this patent disclosure. With this understanding, which pertains to all parts of the present disclosure, some additional examples and observations are offered.

Some embodiments use or provide Label-Based Double Key Encryption (DKE) as a solution that customers in highly regulated industries can use to protect their highly confidential or top secret documents 206 (intellectual property, trade secrets, etc). Customers in these industries have historically been blocked from migrating to the cloud because they need to ensure that the cloud service provider 312 will not, under any circumstances, have access to their data 206 and will not be able to provide third parties with access to customer's data.

DKE provides desirable functionality in part by providing innovative and efficient approaches to data classification and encryption. For example, some embodiments provide customers with a reference implementation 428 of a key management service that they can choose to deploy wherever they choose—on premise, in the cloud, on a third-party cloud, etc. The customer's data 206 is then encrypted by the application 214 that created or edited it, and access to this data 206 is further wrapped by two more keys: the customer's public key 308 which is requested from the deployed reference implementation, and the customer's cloud key 310 which is hosted by a cloud service managed by the cloud service provider 312. Because the content key is first wrapped with the customer's key, even after decrypting the outermost managed key layer the cloud service provider still does not have visibility and access to the plaintext content 206. Thus, in the event of a government agency subpoena, even if the cloud service provider is instructed to decrypt and hand over the data, the government agency would not have visibility into this data without the customer's private key too.

Such embodiments can help customers meet various regulatory compliances by enabling them to host their key in a geographic environment of their choosing. If data regarding country Y should only be opened by employees of nationality Y on within the boundary of country Y using a country Y sovereign cloud, a customer will have the ability to identify and enforce these restrictions, using attributes 326 and DKE 900, for example.

Moreover, in some embodiments, DKE is driven based on a label classification 212 of data 118. Administrators at customers or other entities outside the cloud service provider will configure DKE labels 212 in a security and compliance portal or similar tool, and publish these labels to appropriate user groups in their organization as managed by an LDAP directory, identity provider, or similar subsystem. The customer's key endpoint may be stored in the label metadata, and the latest version of connectable applications 214 may be enhanced to understand how to request this key for both encryption 400 and decryption 1034 purposes. This can be a seamless experience as opposed to how such encryption was done and managed by other approaches.

Moreover, some embodiments provide or permit considerable flexibility and extensibility. Because the cloud service provider controls the outermost key, it can provide customers additional features such as Attribute Based Access Control (ABAC) with DKE, certificate-based authorization, and HSM support. Additionally, architectures and embodiments taught herein will support a variety of kernels 120; they are not inherently limited to operating systems from a particular vendor. Embodiments may also be customized to a particular highly regulated environment while still providing advantages taught herein.

In some embodiments, the cloud service provider doesn't have access to the non-encrypted content key or the non-encrypted data at any point in time. In some, an encrypted document can be stored on-premises or on the cloud and either way the cloud service provider cannot access the plaintext content of the document.

Some embodiments meet a compliance requirement by storing the encryption keys only in a specified geographic location. Some meet a compliance requirement by storing the encryption keys only in the same geographical location as the data 206.

In some embodiments, an office productivity application client uses a web service to request the customer public key (or other user public key) and therefore the client service will not have direct access to the customer key or other user key. In some, a cloud service provider key is used to encrypt the publishing license (metadata) of the document already encrypted with the customer's key; thus the cloud service provider never has access to the customer's public key to encrypt or decrypt the data.

With the understanding that teachings herein are not limited to use with Microsoft-provided software, one may still consider the following examples which use a Microsoft Office 365® client as a connectable application 214 (mark of Microsoft Corporation).

To perform encryption 400, a Microsoft Office 365® client generates 1012 a content key for a document. The Microsoft Office 365® client requests the public key from the customer web service. The customer web service provides its public key from customer custody. Microsoft code encrypts the content key using the customer's public key. Now the content is protected by two distinct encryption operations. The document content is inaccessible to Microsoft. The content key is placed in a policy and protected with the customer's tenant root key. The document is stored with its publishing license.

To perform decryption, the Microsoft Office 365® client sends the publishing license to Azure® Rights Management Service (RMS) (mark of Microsoft Corporation). Azure® RMS authorizes access, and the content key is placed in an end user license, still encrypted with the customer's key. The Microsoft Office 365® client calls the customer web service for the customer's private key to decrypt the content key. Then the Microsoft Office 365® client uses the content key to decrypt the document, and the user can view the document plaintext.

Technical Character

The technical character of embodiments described herein will be apparent to one of ordinary skill in the art, and will also be apparent in several ways to a wide range of attentive readers. Some embodiments address technical activities such as encryption 400, decryption 1034, 1036, attribute-based access control 324, and sensitivity labeling 212 of data 118, each of which is an activity deeply rooted in computing technology. Some of the technical mechanisms discussed include, e.g., double key encryption 900, access control attributes 326, key management services 218, key caches 426, reference implementations 428, and connectable applications 214. Some of the technical effects discussed include, e.g., multilevel encryption 210 and multi-entity key management 1006, tracking and scoping of sensitive data 206 within the overall data 118 realm of an enterprise without access to the actual sensitive data itself, compliance with technical requirements of corporate policy or governmental regulations, and uniformity of user experience across various kinds of computer networks 108. Thus, purely mental processes are clearly excluded. Other advantages based on the technical characteristics of the teachings will also be apparent to one of skill from the description provided.

Some embodiments described herein may be viewed by some people in a broader context. For instance, concepts such as categories, confidentiality, control, levels, or management, may be deemed relevant to a particular embodiment. However, it does not follow from the availability of a broad context that exclusive rights are being sought herein for abstract ideas, they are not. Rather, the present disclosure is focused on providing appropriately specific embodiments whose technical effects fully or partially solve particular technical problems, such as how to comply with storage location requirements when storing sensitive data 206 in a cloud 216. Other configured storage media, systems, and processes involving categories, confidentiality, control, levels, or management are outside the present scope. Accordingly, vagueness, mere abstractness, lack of technical character, and accompanying proof problems are also avoided under a proper understanding of the present disclosure.

Additional Combinations and Variations

Any of these combinations of code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants described above.

More generally, one of skill will recognize that not every part of this disclosure, or any particular details therein, are necessarily required to satisfy legal criteria such as enablement, written description, or best mode. Also, embodiments are not limited to the particular motivating examples and scenarios, operating system environments, attribute or entity examples, software processes, analytic tools, identifiers, data structures, data formats, notations, control flows, naming conventions, or other implementation choices described herein. Any apparent conflict with any other patent disclosure, even from the owner of the present innovations, has no role in interpreting the claims presented in this patent disclosure.

Acronyms, Abbreviations, Names, and Symbols

Some acronyms, abbreviations, names, and symbols are defined below. Others are defined elsewhere herein, or do not require definition here in order to be understood by one of skill.

ALU: arithmetic and logic unit
API: application program interface
BIOS: basic input/output system
CD: compact disc
CPU: central processing unit
DKE: double key encryption
DVD: digital versatile disk or digital video disc
FPGA: field-programmable gate array
FPU: floating point processing unit
GPU: graphical processing unit
GUI: graphical user interface
IaaS or IAAS: infrastructure-as-a-service
ID: identification or identity
IoT: Internet of Things
IP: internet protocol
LAN: local area network
LDAP: lightweight directory access protocol
OS: operating system
PaaS or PAAS: platform-as-a-service
PII: personally identifiable information
RAM: random access memory
ROM: read only memory
TCP: transmission control protocol
TPU: tensor processing unit
UDP: user datagram protocol
UEFI: Unified Extensible Firmware Interface
URI: uniform resource identifier
URL: uniform resource locator
WAN: wide area network Some Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

As used herein, a "computer system" (a.k.a. "computing system") may include, for example, one or more servers, motherboards, processing nodes, laptops, tablets, personal computers (portable or not), personal digital assistants, smartphones, smartwatches, smartbands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include code capable of or subject to scheduling, and possibly to synchronization. A thread may also be known outside this disclosure by another name, such as "task," "process," or "coroutine," for example. However, a distinction is made herein between threads and processes, in that a thread defines an execution path inside a process. Also, threads of a process share a given address space, whereas different processes have different respective address spaces. The threads of a process may run in parallel, in sequence, or in a combination of parallel execution and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

A "routine" is a callable piece of code which normally returns control to an instruction just after the point in a program execution at which the routine was called. Depending on the terminology used, a distinction is sometimes made elsewhere between a "function" and a "procedure": a function normally returns a value, while a procedure does not. As used herein, "routine" includes both functions and procedures. A routine may have code that returns a value (e.g., sin(x)) or it may simply return without also providing a value (e.g., void functions).

"Service" means a consumable program offering, in a cloud computing environment or other network or computing system environment, which provides resources to multiple programs or provides resource access to multiple programs, or does both.

"Cloud" means pooled resources for computing, storage, and networking which are elastically available for measured on-demand service. A cloud may be private, public, community, or a hybrid, and cloud services may be offered in the form of infrastructure as a service (IaaS), platform as a service (PaaS), software as a service (SaaS), or another service. Unless stated otherwise, any discussion of reading from a file or writing to a file includes reading/writing a local file or reading/writing over a network, which may be a cloud network or other network, or doing both (local and networked read/write).

"IoT" or "Internet of Things" means any networked collection of addressable embedded computing or data generation or actuator nodes. Such nodes may be examples of computer systems as defined herein, and may include or be referred to as a "smart" device, "endpoint", "chip", "label", or "tag", for example, and IoT may be referred to as a "cyber-physical system". IoT nodes and systems typically have at least two of the following characteristics: (a) no local human-readable display; (b) no local keyboard; (c) a primary source of input is sensors that track sources of non-linguistic data to be uploaded from the IoT device; (d) no local rotational disk storage—RAM chips or ROM chips provide the only local memory; (e) no CD or DVD drive; (f) embedment in a household appliance or household fixture; (g) embedment in an implanted or wearable medical device; (h) embedment in a vehicle; (i) embedment in a process automation control system; or (j) a design focused on one of the following: environmental monitoring, civic infrastructure monitoring, agriculture, industrial equipment monitoring, energy usage monitoring, human or animal health or fitness monitoring, physical security, physical transportation system monitoring, object tracking, inventory control, supply chain control, fleet management, or manufacturing. IoT communications may use protocols such as TCP/IP, Constrained Application Protocol (CoAP), Message Queuing Telemetry Transport (MQTT), Advanced Message Queuing Protocol (AMQP), HTTP, HTTPS, Transport Layer Security (TLS), UDP, or Simple Object Access Protocol (SOAP), for example, for wired or wireless (cellular or otherwise) communication. IoT storage or actuators or data output or control may be a target of unauthorized access, either via a cloud, via another network, or via direct local access attempts.

"Access" to a computational resource includes use of a permission or other capability to read, modify, write, execute, or otherwise utilize the resource. Attempted access may be explicitly distinguished from actual access, but "access" without the "attempted" qualifier includes both attempted access and access actually performed or provided.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses computational resource users, which may also include or be referred to as coroutines, threads, tasks, interrupt handlers, application processes, kernel processes, procedures, or object methods, for example. As a practical matter, a "process" is the computational entity identified by system utilities such as Windows® Task Manager, Linux® ps, or similar utilities in other operating system environments (marks of Microsoft Corporation, Linus Torvalds, respectively). "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). "Process" and "method" in the patent law sense are used interchangeably herein. Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided. Steps performed automatically are presumed to include at least one operation performed proactively.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment. Data confidentiality 208 protection operations such as encryption 400, decryption 1034, 1036, data 118 sensitivity labeling 212, key management 1006, and many other operations discussed herein, are understood to be inherently digital. A human mind cannot interface directly with a CPU or other processor, or with RAM or other digital storage, to read and write the necessary data to perform the data confidentiality protection steps taught herein. This would all be well understood by persons of skill in the art in view of the present disclosure.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

Throughout this document, use of the optional plural "(s)", "(es)", or "(ies)" means that one or more of the indicated features is present. For example, "processor(s)" means "one or more processors" or equivalently "at least one processor".

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

One of skill will recognize that this innovation disclosure discusses various data values and data structures, and recognize that such items reside in a memory (RAM, disk, etc.), thereby configuring the memory. One of skill will also recognize that this innovation disclosure discusses various algorithmic steps which are to be embodied in executable code in a given implementation, and that such code also resides in memory, and that it effectively configures any general purpose processor which executes it, thereby transforming it from a general purpose processor to a special-purpose processor which is functionally special-purpose hardware.

Accordingly, one of skill would not make the mistake of treating as non-overlapping items (a) a memory recited in a claim, and (b) a data structure or data value or code recited in the claim. Data structures and data values and code are understood to reside in memory, even when a claim does not explicitly recite that residency for each and every data structure or data value or piece of code mentioned. Accordingly, explicit recitals of such residency are not required. However, they are also not prohibited, and one or two select recitals may be present for emphasis, without thereby excluding all the other data values and data structures and code from residency. Likewise, code functionality recited in a claim is understood to configure a processor, regardless of whether that configuring quality is explicitly recited in the claim.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as associating, communicating, configuring, decrypting, employing, encrypting, generating, getting, obtaining, producing, protecting, reading, receiving, supplying, using, utilizing, verifying (and associates, associated, communicates, communicated, etc.) with regard to a destination or other subject may involve intervening action such as the foregoing or forwarding, copying, uploading, downloading, encoding, decoding, compressing, decompressing, encrypting, decrypting, authenticating, invoking, and so on by some other party, including any action recited in this document, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

- 100 operating environment, also referred to as computing environment
- 102 computer system, also referred to as a "computational system" or "computing system", and when in a network may be referred to as a "node"
- 104 users, e.g., an analyst or other user of an enhanced system 202
- 106 peripherals
- 108 network generally, including, e.g., clouds, local area networks (LANs), wide area networks (WANs), client-server networks, or networks which have at least one trust domain enforced by a domain controller, and other wired or wireless networks; these network categories may overlap, e.g., a LAN may have a domain controller and also operate as a client-server network
- 110 processor
- 112 computer-readable storage medium, e.g., RAM, hard disks
- 114 removable configured computer-readable storage medium
- 116 instructions executable with processor; may be on removable storage media or in other memory (volatile or non-volatile or both)
- 118 data
- 120 kernel(s), e.g., operating system(s), BIOS, UEFI, device drivers
- 122 tools, e.g., anti-virus software, firewalls, packet sniffer software, intrusion detection systems, intrusion prevention systems, other cybersecurity tools, debuggers, profilers, compilers, interpreters, decompilers, assemblers, disassemblers, source code editors, auto-completion software, simulators, fuzzers, repository access tools, version control tools, optimizers, collaboration tools, other software development tools and tool suites (including, e.g., integrated development environments), hardware development tools and tool suites, diagnostics, enhanced browsers, and so on
- 124 applications, e.g., word processors, web browsers, spreadsheets, games, email tools, commands
- 126 display screens, also referred to as "displays"
- 128 computing hardware not otherwise associated with a reference number 106, 108, 110, 112, 114
- 202 enhanced computers, e.g., computers 102 (nodes 102) enhanced with data confidentiality protection functionality
- 204 data confidentiality protection functionality, e.g., functionality which does at least one of the following: provides multilevel encryption, provides labeling, provides label-driven DKE, conforms with the FIG. 10 flowchart or its constituent flowchart 900, or otherwise provides capabilities first taught herein
- 206 sensitive data; may also be referred to as "confidential" data or "top secret" data or "content", with the understanding that in labeling or other contexts distinctions may still be made between different kinds or priorities or levels of data sensitivity
- 208 confidentiality, e.g., as opposed to non-confidentiality in which data is freely accessible to the general public; for present purposes, privacy may be considered an aspect of confidentiality
- 210 multilevel encryption functionality; also refers to multilevel encryption as an operation or a result
- 212 sensitivity labeling functionality; also refers to sensitivity labeling as an operation or a result, and to sensitivity labels per se
- 214 connectable application; an application 124 that is connected to a network or can be connected to a network as part of its normal intended operation; a connectable application may be, e.g., a cloud-based application 802 or a cloud-connected application 804
- 216 cloud; also referred to as "cloud computing environment"
- 218 key management service; also referred to as "key store"
- 220 user key generally
- 302 interface
- 304 double key encryption software
- 306 content key, e.g., a symmetric key randomly generated for every new document encrypted; someone that is granted access to the document can use the content key to decrypt and obtain plaintext of the content
- 308 user public key, e.g., public portion of an asymmetric key pair maintained by a customer; also referred to as the "customer key"; may be pair maintained by the customer in their reference implementation, for instance; in general the customer key is the first layer of encryption on the content key; a company deploying a reference implementation manages this customer key and access is granted through the reference implementation to users
- 310 cloud service provider key, e.g., public portion of an asymmetric key pair maintained by a cloud service provider; an example is a Microsoft Managed Key hosted in an Azure® cloud, which is an asymmetric key pair maintained by Microsoft; in general the cloud service provider key is the second layer of encryption applied on the content key after it has been encrypted by the customer's key; access to the cloud service provider key may be granted based on a policy 322; in some embodiments two asymmetric key pairs 308 and 310 represent the double key in "double key encryption" to protect content keys—both are used to decrypt the content
- 312 cloud service provider
- 314 publishing license data structure
- 316 user key store URL, e.g., network address and directory path of API for key management service 218 that manages user keys 220
- 318 cloud tenant
- 320 root key of a cloud tenant
- 322 policy data structure 324 access control, e.g., a security control that restricts access to data 118; also refers to the act of controlling access
326 access control attribute
328 access control subsystem, e.g., a system 102 configured to perform access control
400 encryption generally
402 key used for encryption or decryption or both
404 level of encryption
406 key management entity
408 public key
410 private key
412 key pair containing a public key and a corresponding private key
414 symmetric encryption or decryption
416 asymmetric encryption or decryption
418 encryption type, e.g., which encryption algorithm is used, what key length is used; understood to be one or more digital values
420 preference indicating an encryption type; understood to be one or more digital values
422 file which includes digital data; for present purposes, may be a document, chunk, block, blob, or other quantum of digital data storage
424 account which provides an authorized user with access to data 118 or computer-implemented services
502 object attribute
504 context attribute
506 subject attribute
508 action attribute
510 geographic attribute
512 jurisdictional attribute
602 label 212 defined in a policy 322, typically by an administrator
604 label 212 defined by a user 104
702 on-premises network 108
704 hybrid network 108
802 cloud-based application, e.g., SaaS delivered from a cloud which does not operate as intended unless the machine running it has a connection to the cloud
804 cloud-connected application; may connect to a cloud but also supports offline operation when the machine running it has no connection to the cloud
806 spreadsheet application
808 word processor application
810 email application
812 slide presentation application
900 flowchart; 900 also refers to double key encryption methods illustrated by or consistent with the FIG. 9 flowchart
902 get a content key; refers to computational activity, e.g., generating a content key from a random seed, or retrieving a content key over a network connection to a key generator
904 encrypt data; refers to computational activity; the data being encrypted 904 may be, e.g., content 206 or a key or a previously encrypted key
906 produce encrypted content 206 through computational activity using a content key 306
908 content encrypted through computational activity using a content key 306
910 obtain a user public key through computational activity, e.g., using a call to an API of a service 218
912 produce an encrypted content key through computational activity using a user key
914 content key encrypted through computational activity using a user key
916 produce a doubly encrypted content key through computational activity using a cloud service provider key
918 content key doubly encrypted through computational activity using a user key and then using a cloud service provider key
1000 flowchart, 1000 also refers to data confidentiality protection methods illustrated by or consistent with the FIG. 10 flowchart (which incorporates the steps of FIG. 9)
1002 protect data confidentiality by one or more technical mechanisms
1004 utilize encryption keys
1006 manage encryption key, e.g., have authority over whether the key is provided in response to a request for it
1008 configure data protection mechanism(s) based at least partially on a label 212, e.g., make connections, set or override default values, install or enable software code, provide authentication credentials
1010 configure data protection mechanism(s) based at least partially on an attribute 326, e.g., make connections, set or override default values, install or enable software code, provide authentication credentials
1012 generate a content key algorithmically in a computing system
1014 associate sensitive data and a label with one another, e.g., by identifying at least one in a data structure of the other or by identifying both in a single data structure or by identifying or using both in a given software routine
1016 verify computationally that a label induces double key encryption
1018 induce double key encryption
1020 computationally read a key management service URL
1022 computationally employ an attribute-based access control
1024 associate sensitive data and multiple labels with one another, e.g., by identifying all three items in a single data structure or by identifying or using all three in a given software routine
1026 require computationally that multiple labels be satisfied to gain access
1028 satisfy a label 212, e.g., determine computationally that conditions defined by a label are met
1030 communicate electronically with a reference implementation, e.g., by network transmissions
1032 computationally obtain an encrypted key
1034 computationally decrypt an encrypted key
1036 computationally decrypt encrypted data 206
1038 computationally use a key cache in a memory 112
1040 computationally limit duration of access to a key cache
1042 computationally receive a preference 420
1044 configure a system 102 according to a preference 420
1046 computationally supply label data 212 to an analytics engine
1048 analytics engine, e.g., hardware and software that computationally collect, filter, sort, derive statistics from, or otherwise process instance data, such as data about instances of content 206
1050 configure a system 102 with one or more additional protections 1052 beyond labeling 212 and DKE
1052 any technical mechanism for data confidentiality or availability or integrity protection beyond labeling 212 and DKE

1054 any step discussed in the present disclosure that has not been assigned some other reference numeral

CONCLUSION

In short, the teachings herein provide a variety of data confidentiality protection functionalities 204 which operate in enhanced systems 202. Cybersecurity is enhanced, with particular attention to storage of sensitive data 206 in a cloud 216. Double key encryption 900 encrypts 904 sensitive data 206 using a content key 306, obtains 910 a user public key 308 from a key management service 218, encrypts 904 the content key 306 using the user public key 308, and then encrypts 904 the result 914 using a cloud service provider key 310 to produce 916 a double-encrypted content key 918. Data confidentiality 208 is protected 1002 efficiently through multilevel encryption 210 and also by utilizing 1004 keys 402 that are managed 1006 by different entities 406, e.g., the user's organization and the cloud service provider 312. Sensitivity labeling 212 in label-based double key encryption implementations allows an analytics engine 1048 to track sensitive data 206 without compromising confidentiality 208 of that data 206. Compliance mechanisms (not shown) may use attribute-based access control 324 with geographic attributes 510 or jurisdictional attributes 512 to support storage of sensitive data 206 in a cloud 216, but only inside a permitted region, and without giving the cloud service provider 312 access to the plaintext form of the sensitive data 206. Some compliance mechanisms use attribute-based access control 234 with an industry standard attribute 326 for an industry standard, such as PCI-DSS (Payment Card Industry Data Security Standard).

Embodiments are understood to also themselves include or benefit from tested and appropriate security controls and privacy controls such as the General Data Protection Regulation (GDPR). Use of the tools and techniques taught herein is compatible with use of such controls.

Although Microsoft technology is used in some motivating examples, the teachings herein are not limited to use in technology supplied or administered by Microsoft. Under a suitable license, for example, the present teachings could be embodied in software or services provided by other cloud service providers.

Although particular embodiments are expressly illustrated and described herein as processes, as configured storage media, or as systems, it will be appreciated that discussion of one type of embodiment also generally extends to other embodiment types. For instance, the descriptions of processes in connection with FIGS. 9 and 10 also help describe configured storage media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Those of skill will understand that implementation details may pertain to specific code, such as specific thresholds or ranges, specific architectures, specific attributes, and specific computing environments, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

With due attention to the items provided herein, including technical processes, technical effects, technical mechanisms, and technical details which are illustrative but not comprehensive of all claimed or claimable embodiments, one of skill will understand that the present disclosure and the embodiments described herein are not directed to subject matter outside the technical arts, or to any idea of itself such as a principal or original cause or motive, or to a mere result per se, or to a mental process or mental steps, or to a business method or prevalent economic practice, or to a mere method of organizing human activities, or to a law of nature per se, or to a naturally occurring thing or process, or to a living thing or part of a living thing, or to a mathematical formula per se, or to isolated software per se, or to a merely conventional computer, or to anything wholly imperceptible or any abstract idea per se, or to insignificant post-solution activities, or to any method implemented entirely on an unspecified apparatus, or to any method that fails to produce results that are useful and concrete, or to any preemption of all fields of usage, or to any other subject matter which is ineligible for patent protection under the laws of the jurisdiction in which such protection is sought or is being licensed or enforced.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral.

Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a", "an", and "the" are inclusive of one or more of the indicated item or step. In particular, in the claims a reference to an item generally means at least one such item is present and a reference to a step means at least one instance of the step is performed. Similarly, "is" and other singular verb forms should be understood to encompass the possibility of "are" and other plural forms, when context permits, to avoid grammatical errors or misunderstandings.

Headings are for convenience only; information on a given topic may be found outside the section whose heading indicates that topic.

All claims and the abstract, as filed, are part of the specification.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A system configured for multilevel encryption confidentiality protection, the system comprising:
    a digital memory; and
    a processor in operable communication with the memory, the processor configured to perform double key encryption steps for protecting confidentiality of sensitive data, the sensitive data associated with a sensitivity label which represents a data classification that is based on at least one of: a keyword in the sensitive data, who generated the sensitive data, a context attribute, a subject attribute, or an action attribute, the steps including (a) getting a content key, (b) encrypting the sensitive data using the content key, thereby producing content-key-encrypted sensitive data, (c) obtaining a user public key from a user key management service, (d) encrypting the content key using the user public key, thereby producing a user-key-encrypted content key that is decryptable using a user private key that corresponds to the user public key, and (e) encrypting the user-key-encrypted content key using a cloud service provider key, thereby producing a double-encrypted content key;
    whereby confidentiality of the sensitive data is protected by using at least three levels of encryption and also by utilizing keys which as a set are managed by at least two key management entities.

2. The system of claim 1, further characterized in at least one of the following ways:
    the content key is a symmetric encryption key; or
    the cloud service provider key is a public key which corresponds to a cloud service provider private key.

3. The system of claim 1, further characterized in at least one of the following ways:
    the content key is generated by a cloud-connected application;
    the cloud service provider key is a cloud tenant root key; or
    the user-key-encrypted content key is in a publishing license which also contains a rights management policy.

4. The system of claim 1, wherein the sensitivity label is further characterized in at least one of the following ways:
    the sensitivity label includes a uniform resource locator of the user key management service; or
    the sensitivity label indicates that double key encryption is in use to protect the sensitive data.

5. The system of claim 1, wherein the sensitive data is associated with a particular sensitivity label value which induces double key encryption protection, and the system is configured to perform the double key encryption steps in response to the particular sensitivity label value.

6. The system of claim 1, wherein the system is further configured with an attribute-based access control subsystem which is configured to utilize the keys to control access to the sensitive data based on at least one attribute defined in a policy.

7. A method performed by or on behalf of a connectable application to enhance confidentiality protection of sensitive data, the method comprising:
    getting a content key which is a symmetric encryption key;
    symmetrically encrypting the sensitive data using the content key, thereby producing content-key-encrypted sensitive data;
    obtaining a user public key from a user key management service;
    asymmetrically encrypting the content key using the user public key, thereby producing a user-key-encrypted content key that is decryptable using a user private key that corresponds to the user public key;
    asymmetrically encrypting the user-key-encrypted content key using a cloud service provider key managed by a cloud service provider, thereby producing a double-encrypted content key; and
    employing an attribute-based access control coordinated with double key encryption to control access to the sensitive data based on at least one of the following attributes: a geographic attribute, or a legal jurisdiction attribute, or an industry standard attribute;
    whereby confidentiality of the sensitive data is protected by using at least three levels of encryption and also by utilizing keys which as a set are managed by at least two key management entities.

8. The method of claim 7, wherein the method further comprises verifying, prior to asymmetrically encrypting the content key using the user public key, that a sensitivity label which is associated with the sensitive data induces double key encryption.

9. The method of claim 7, wherein obtaining the user public key from the user key management service comprises reading a uniform resource locator of the user key management service, from a location associated with a sensitivity label which is associated with the sensitive data.

10. The method of claim 7, wherein the method controls access to the sensitive data based on at least the legal jurisdiction attribute.

11. The method of claim 7, wherein the method comprises associating multiple labels with the sensitive content, the labels including a first label which induces double key encryption protection of the sensitive content and also including a second label which specifies a user-defined protection of the sensitive content.

12. The method of claim 7, wherein the method is repeated by instances of the connectable application for multiple sets of sensitive data which reside respectfully in at least two of the following: a cloud, an on-premises network, or a hybrid network which spans a cloud and an on-premises network.

13. The method of claim 7, wherein obtaining the user public key from the user key management service comprises communicating with a reference implementation of the user key management service.

14. The method of claim 7, further comprising:
obtaining the user-key-encrypted content key from the cloud service provider;
obtaining the user private key from the user key management service;
decrypting the user-key-encrypted content key using the user private key, thereby reproducing the content key in a fully decrypted form; and
decrypting the sensitive data using the fully decrypted content key.

15. The method of claim 7, wherein the method is performed by or on behalf of one of the following connectable applications: a cloud-based word processor, a cloud-connected word processor which runs locally on a user machine outside the cloud, a cloud-based slide presentation application, a cloud-connected slide presentation application which runs locally on a user machine outside the cloud, a cloud-based spreadsheet application, a cloud-connected spreadsheet application which runs locally on a user machine outside the cloud, or an email application.

16. A computer-readable storage medium configured with data and instructions which upon execution by a processor cause a computing system to perform a method to enhance confidentiality protection of sensitive data, the method comprising:
encrypting the sensitive data using a content key, thereby producing content-key-encrypted sensitive data;
obtaining a user public key from a user key management service;
asymmetrically encrypting the content key using the user public key, thereby producing a user-key-encrypted content key that is decryptable using a user private key that corresponds to the user public key;
asymmetrically encrypting the user-key-encrypted content key using a cloud service provider key managed by a cloud service provider, thereby producing a double-encrypted content key; and
supplying label data to an analytics engine without providing the analytics engine access to the sensitive data in an unencrypted form;
whereby confidentiality of the sensitive data is protected by using at least three levels of encryption and also by utilizing keys which as a set are managed by at least two key management entities.

17. The storage medium of claim 16, further comprising caching at least one of the following for at least eight hours: the user public key, the cloud service provider key, thereby reducing or eliminating repetition of operations which obtained the cached key or keys prior to caching.

18. The storage medium of claim 16, further comprising receiving an encryption type preference and configuring an implementation of asymmetric encryption of the content key with the user public key to conform with the encryption type preference.

19. The storage medium of claim 16, further comprising configuring at least one of the following additional protection mechanisms based at least in part on a result from the analytics engine: multi-factor authentication, attribute-based access control, data loss prevention, access tracking, or access revocation.

20. The storage medium of claim 16, further comprising the analytics engine tracking at least one of the following: locations of sensitive data, or usages of sensitive data.

* * * * *